May 6, 1958     R. G. OWEN     2,833,638
HARD FACING MATERIAL AND METHOD OF MAKING
Filed March 24, 1955     2 Sheets-Sheet 1
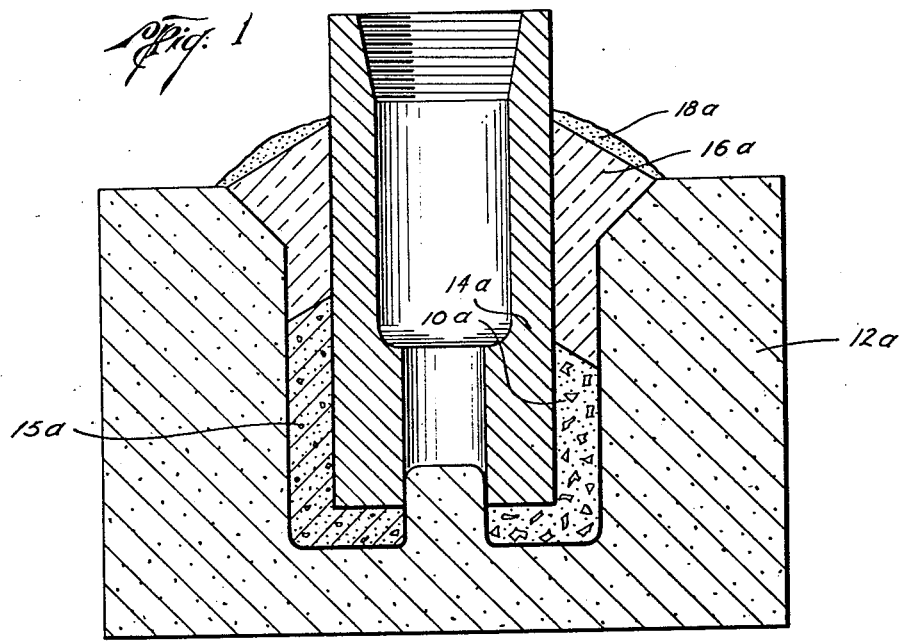
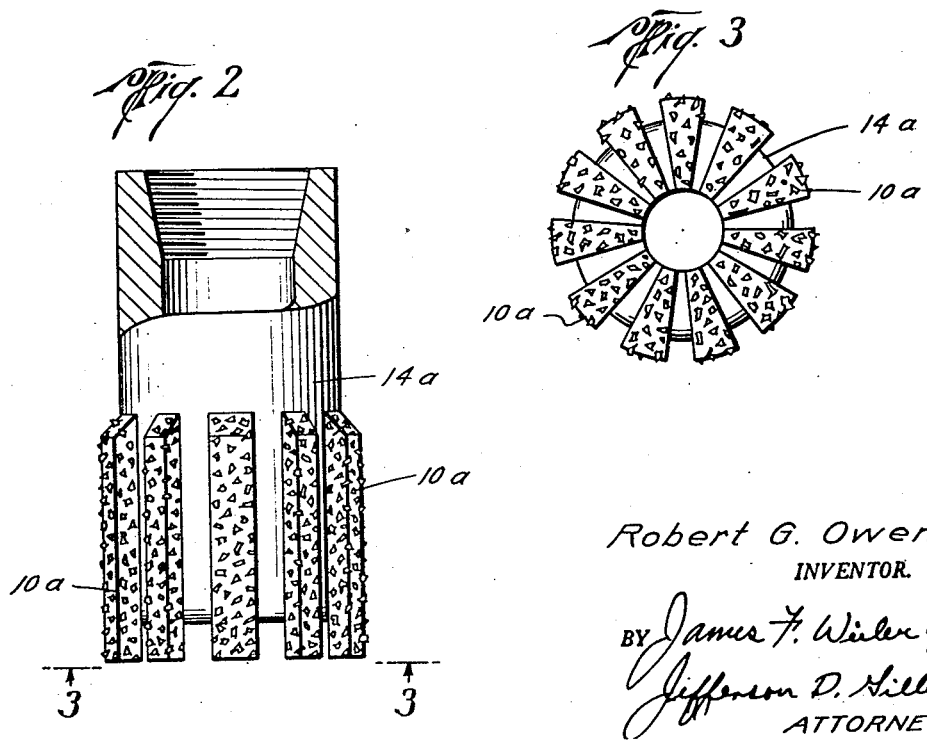
Robert G. Owen
INVENTOR.
BY James F. Wieler
Jefferson D. Hiller
ATTORNEYS

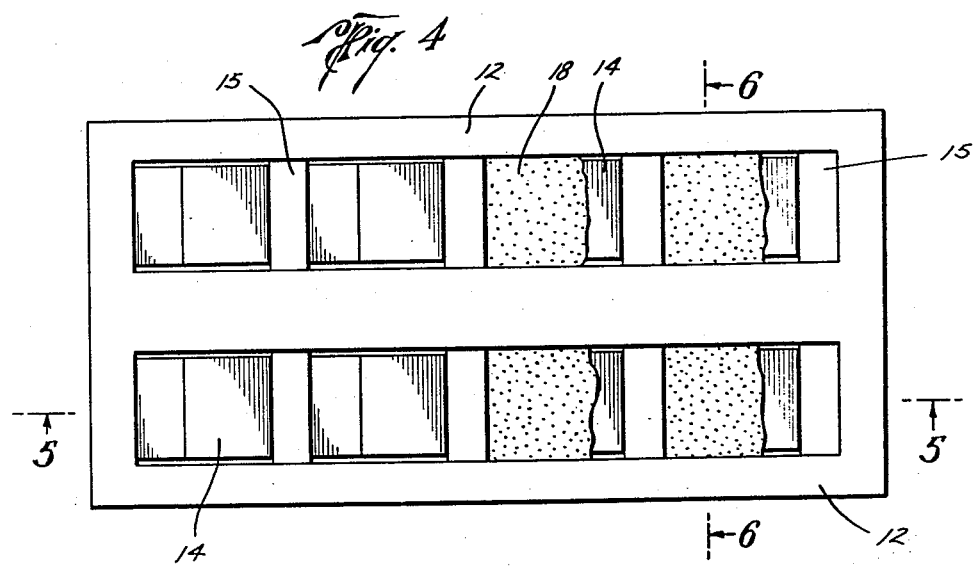
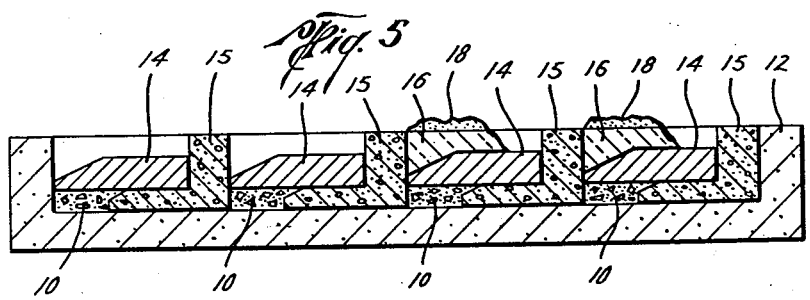
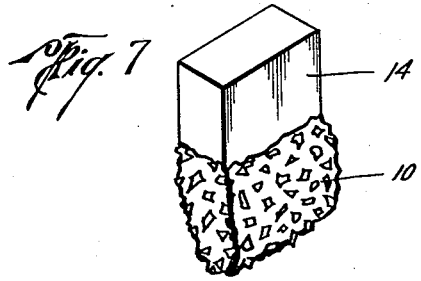
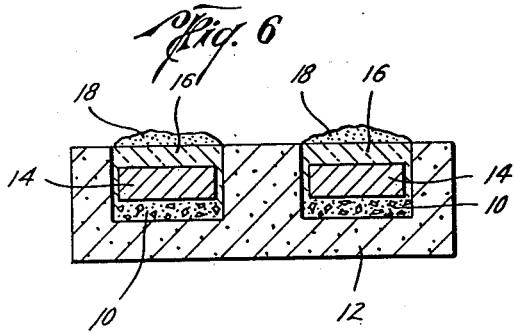

United States Patent Office 2,833,638
Patented May 6, 1958

2,833,638
HARD FACING MATERIAL AND METHOD OF MAKING

Robert G. Owen, Los Angeles, Calif., assignor to Servco Manufacturing Corporation, Long Beach, Calif., a corporation of California Application March 24, 1955, Serial No. 496,498

9 Claims. (Cl. 51—309)

The present invention relates to hard facing material and its method of manufacture.

It has been the practice to apply hard facing or surfacing material to various cutting tools, milling tools and wear surfaces to prolong the life of the particular tools and surfaces and to increase the cutting or milling action of the tool and to decrease the amount of time necessary to make the desired cut or mill. To this end, various cutting tools, milling tools and wear surfaces have been hard faced or surfaced with abrasives, such as the cemented carbides as well as diamonds and the like.

In the case of what might be termed metal particles, such as the tungsten carbides, it is a practice to suspend the tungsten carbide particles in a welding rod which, in turn, is applied as a hard facing material to the metal surface to be hard faced. In some cases, the tungsten carbide particles are fused directly to the metal surface. Neither of these practices are entirely satisfactory due to the fact that in fusing the particles of hard metal, such as the cemented carbides, to the binder material or matrix, the fused interfaces between the binder material and the hard metal particles are very brittle, as are the metal particles, and do not withstand shock. Accordingly, the metal particles are easily dislodged from position and, accordingly, do not fully perform their intended purpose. In addition, with respect to cutting tools, the hard metal particles are ordinarily in very small size and, accordingly, provide very little abrading or cutting surface to the object which is being cut.

In other cases, for example, tool shanks used for turning steel in a lathe, preformed inserts of cemented carbide have been brazed to the steel shank. This is not entirely satisfactory, however, due to the fact that the hard metal insert is sensitive to mechanical shock and once the cutting edge is broken, the tool is of no further use.

In the case of those abrading tools utilizing diamonds, these are not entirely satisfactory due to the great expense of providing such a cutting or abrading tool and the difficulty encountered in maintaining the diamonds suspended in a satisfactory matrix so that after a portion of the diamond has been worn away or the matrix surrounding the diamond has been worn away to a certain extent, the diamonds fall out. In addition, the diamonds crack and fall out and if one sticks in a piece of metal, it strips out diamonds in the matrix.

The excellent cutting ability and abrasive resistance of cemented carbides, a powder metallurgy product, are well known to the trade. It would be highly advantageous to provide a means of attaching the cemented carbides to a tool bit or other metal surface in a manner that preserves and does not alter in any way the abrasive and cutting properties of the cemented carbides.

Material commonly known as cemented or sintered carbide is presently available on the market. The material comprises unitary bodies, formed to any desired shape, consisting of a mass of small particles or grains of pure metal carbides bonded or "cemented" together by a bonding metal. The metals most commonly used for cementing the carbide grains into a solid body are cobalt, nickel, and iron. The terms "cemented carbides" and "sintered carbides" are considered synonymous and are commonly used in the trade to identify the material described above. Applicant's use hereinafter of the term "cemented carbides" will be understood to refer to said bodies of material.

It is therefore a major object of the present invention to provide a hard facing material and a method of manufacturing thereof in which cemented carbide bodies are tenaciously retained by a tough, ductile and shock proof binder material without a brittle interface so that full utilization thereof for cutting or resisting wear is obtained.

Yet a further object of the present invention is the provision of such a hard facing material and its method of manufacture in which cemented carbide bodies are tenaciously retained in a matrix of binder material which is tough, resilient and shock proof and which is capable of withstanding severe forces while tenaciously retaining the cemented carbide bodies.

A still further object of the present invention is the provision of such a hard facing material and method of making the same in which cemented carbide bodies are tenaciously held in the binder material or matrix by means of intergranular penetration of the binder material or matrix into the cemented carbide bodies and in which the desirable properties of the cemented carbides are not destroyed.

A still further object of the present invention is the provision of a method of making hard facing material and a hard facing material in which cemented carbide bodies are tenaciously held in the binder material or matrix by intergranular penetration and alloying of the cement material of the cemented carbides with the binder material by heating the binder material and cemented carbide to a temperature below the melting point of the cementing material of the cemented carbide bodies, which temperature is of the order of about 2400° F. to 2650° F., for presently known cemented carbides.

A still further object of the present invention is the provision of such a hard facing material and a method of making the same in which cemented carbide bodies are tenaciously held in the binder material or matrix by means of desirable alloying and intergranular penetration of the binder material or matrix into the cemented carbide bodies and without the formation of brittle compounds at the interfaces.

Yet a still further object of the present invention is the provision of such a hard facing material and a method of making the same in which the qualities of the binder or matrix material may be varied for various uses; for example, for self sharpening purpose the matrix may wear away relatively rapidly to expose new cutting edges of the cemented carbides, it may be more ductile to provide a cushion for rugged use, such as on a stabilizer used in the Oil Industry and the like, or it may be more wear resistant to erosion, such as drilling fluids used in drilling oil, gas and other wells.

A still further object of the present invention is the provision of a hard facing material and a method of making the same in which the matrix or binder material absorbs to a large extent the residual stress which is caused by the difference in the coefficients of expansion between the carbide bodies, matrix and metal surface caused by the thermal method of attaching relatively large cemented carbide bodies to a metal surface. This results in carbides which are relatively free of internal stress and therefore are not overly sensitive to mechanical shock, the matrix in effect being the transition or cushioning medium for this purpose between the bodies and the metal surface.

Yet a further object of the present invention is the method of making a hard facing material and the provision of hard facing material which may either comprise an abrading means itself or be applied to a tool for that purpose and which is composed of a plurality of irregular and jagged or uniform and preshaped pieces of cemented carbide, such as shattered cemented carbides, or of carbide particles and cemented carbide bodies of preformed shape, which are of relatively large size and which are dispersed in random or systematic fashion throughout a binder medium and tenaciously maintained and held thereby by means of intergranular penetration of the binder material with the hard metal bodies and alloying of the cement material of the cemented carbide bodies with the binder material without brittle interfaces.

Yet a further object of the present invention is the provision of hard surfacing material and its method of manufacture in which relatively large pieces of cemented carbide bodies of irregular or preformed size and shape are tenaciously held in a suitable binder or matrix so that as particles of the hard metal are worn away and as the binder is worn away new cutting surfaces are exposed thereby providing a self sharpening action. For example, the bodies may be irregular, or large flat pieces for abrasion, or diamond or other shape dispersed either in random or in systematic arrangement throughout the binder medium.

Heretofore and currently tungsten carbide bodies are encased or suspended in a welding rod for application to a metal surface to be hard faced. In such cases fused tungsten carbide or melted tungsten carbide particles are attached to the metal surface which contain WC and $W_2C$, which are the two forms of tungsten carbide. $W_2C$ does not have desirable hard facing qualities because it is extremely brittle and is not tough. On the other hand, WC has the desired hardness and some toughness, particularly when cemented, for example, with cobalt or nickel or iron. $W_2C$ cannot be cemented in this manner to make a powder metallurgy product, such as cemented carbide. When WC is melted, however, some $W_2C$ is formed which combines with cobalt, nickel or iron to form a very hard and brittle and non-useful intermetallic compound. Cemented carbides are made with WC and commercially sold in that form and it would be highly advantageous to take advantage of the desirable properties of WC when applied to a metal surface without forming any $W_2C$. Thus, it is therefore an important object of the present invention to provide a hard facing material and a method of making the same in which cemented carbides, that is, carbides including WC rather than $W_2C$ are bonded in a suitable matrix or binder material with no or a minimum formation of $W_2C$, and which hard facing material can be applied to a metal surface with little or no formation of $W_2C$ thereby retaining the desirable properties of tungsten carbide, the WC form, with no or substantially none of the undesirable properties thereof, that is, the $W_2C$ form. Heating the WC to too high a temperature or holding the material at a high temperature for too long a period of time results in the formation of $W_2C$, as will be further described, and may also result in changing the grain structure of a cemented carbide body by enlarging the grains and producing a structurally weak and fairly friable body. Both the above-noted effects injure the bodies and render them unsuitable for applicant's purposes. The use hereinafter of the term "injurious effects," or its equivalent, is intended to refer to the effects discussed above.

The present invention is particularly adapted and suited for use in connection with tools used in the drilling, production and maintenance of oil, gas and like wells and, for the purpose of disclosure, the description of presently preferred examples are directed toward this end. Other uses and adaptations, however, will readily suggest themselves to those skilled in the art.

In many of the operations necessary for the drilling, production and maintenance of oil, gas and like wells, the qualities of wear resistance are an important economic factor. In some of these operations diamonds have been used because of their extreme hardness. Diamonds, however, have definite mechanical limitations, for example, as mentioned previously, difficulty has been encountered in bonding or holding diamonds in a matrix, particularly in rough treatment, and, in addition, diamonds are extremely expensive which limits their common use for obvious economic reasons. Tungsten carbide, as well as other hard facing materials, has been used for its wear resistant qualities on a number of tools. These hard facing materials have not been entirely satisfactory due to the fact that they cannot withstand rough treatment, such as severe forces, shock and the like for the reasons mentioned previously, to which they are subjected to in use in oil well operations and the fact that their abrading or cutting and wearing qualities are not all that they should be.

The application of hard facing materials, such as tungsten carbide, as used in oil well operations, may be grouped generally into three classifications. The first group are those in which the hard facing materials are used for their wear resistant qualities, such as on those tools or elements of tools that engage the bore hole, such as tool joints, subs, stabilizers, drill collars, rotary shoes, and the like. The second group include those which are applied to various cutting surfaces or elements which engage and cut the formation or cement in the well bore, such as bits, reamers, key seat tools, coring tools, rotary shoes and the like in which the cutting elements may either be integral or may be inserts of one kind or another. The third group includes the use of hard facing materials on various metal cutting tools, for example, those used in cutting tubular goods and various types of mills, milling tool knives, cutters, such as inside and outside cutting tools for cutting fish in the bore hole and the like.

It is common practice in the art to apply hard metal particles or hard facing material, such as tungsten carbide, by welding. In the welding operation, the hard metal particles are fused to the base metal and this is accomplished by either electric arc welding, or gas welding, such as the oxygen-acetylene torch. Usually the hard metal particles are suspended or held in a welding rod formed of a suitable binder material or these may be applied manually. The mesh size of tungsten carbide particles or other hard metal grains presently used is from about twenty to about sixty and during the melting operation, there is a fusion at the interfaces of the base or binder metal with the hard metal grains. In addition, due to the intense heat, many of the hard metal grains or particles are melted. This results in an inefficient and ineffectual bond for the purpose intended due to the fact that the bond between the binder or base metal and the hard metal particles or grains is of a brittle nature so that the particles crack and break away from the base metal due to lack of ductility, toughness and shock resistance. This, of course, results in inferior wear resistant qualities and abrading or cutting qualities.

The present invention is based upon the surprising discovery that a tough, resilient, ductile and shock proof bond is obtained between the binder material and the cemented carbide bodies by heating the binder material and bodies dispersed therein to a temperature at which the binder material becomes molten but not in excess of that which will cause the cemented carbide bodies to lose their desirable original properties, which temperature is of the order of about 2400° F. to 2650° F., and maintaining the binder material in a molten or plastic state below such temperature for a period of time sufficient to permit adequate intergranular penetration of the binder material between the carbide grains of the cemented carbide bodies. While the temperatures will vary with the particular binders or matrixes, cemented carbides, conditions and length of time used, for most hard facing materials for oil field use, temperatures of the order of from about 1600° F. to about 2450° F. for a period of about fifteen minutes are satisfactory, although other temperatures, say up to 2700° F. or up to 3000° F. may be used for short periods of time. It is essential that little or no $W_2C$ be formed to avoid the brittle interface previously described and by using special equipment and short periods of time, higher temperatures may be used. This results in a tenacious bond between the binder material and the metal bodies without a brittle metallic interface.

The cemented carbide bodies may be of any preferred type and for oil field use should be extremely hard. For example, the cemented or sintered carbides, such as the carbides of tungsten, molybdenum, chromium, vanadium, zirconium, titanium, uranium, tantalum and columbium, and the like may be used. Obviously, it is extremely desirable to utilize as hard particles as possible and the present invention makes this possible. Thus, in general, all the cemented carbides may be used and particularly those having a minimum hardness of about 85 Rockwell A are satisfactory; although, for some purposes, softer particles may be used.

Preferably, the cemented or sintered carbide bodies are shattered, such as by impacting, to produce jagged, irregular shapes and preferably are screened to obtain sizes varying from about 3/64th inches to about 1/4th of an inch for most oil tool operations. If desired, these bodies may be preformed into desired shapes, such as diamond and other shapes. In this connection it is noted that in brazing large preformed cemented carbide inserts, such as mentioned previously in the tool steel art, these inserts are sensitive to shock and do not have a self sharpening action. It is when the cemented carbide bodies are substantially encased in the binder according to the invention that the advantageous results mentioned are obtained.

After the cemented carbide bodies have been shattered and screened or formed into desired shapes, they are cleaned with a degreasing agent, such as carbon tetrachloride. The cleaned cemented carbide bodies may then be placed in an inert refractory mold capable of withstanding high temperatures, such as a ceramic mold, in shapes or cavities as desired and suitable bonding material or matrix material alloys added. Preferably a brazing flux is added and a high temperature slag, such as powdered glass, is added to prevent or minimize oxidation.

The mold is then placed in a suitable furnace at either atmospheric pressures or otherwise and heated to a temperature necessary to bring the binder and flux to the molten state where it is held at that state for a period of time sufficient to obtain intergranular penetration of the binder material with the cemented carbide bodies and alloying of the binder material with the cement material of the bodies. It is of utmost importance to keep the temperature below the melting point of the cementing material of the cemented carbides. As mentioned previously this temperature is of the order of 2400° F. to 2650° F. although it may be higher for short periods of time and under special circumstances. The mold is then removed from the furnace and cooled at room temperature.

The mass of hard bodies and matrix are then cleaned and may be applied as mentioned later.

Any suitable binder material or matrix may be used which has the property of wetting the hard metal bodies selected and which has a melting point below that of the cementing material of the cemented carbide bodies so that the binder material or matrix may be heated to a molten state without injurious heating of the cemented carbide bodies. In addition, the binder material or matrixes may be relatively tough and preferably resist wear and should be able to alloy with the material to which the hard facing material is applied. For the purposes of illustration, the following binder or matrix materials are satisfactory, although it will be understood that others having desirable properties may be used.

EXAMPLE I

Pure copper may be used as the binder or matrix material.

EXAMPLE II

Copper-zinc alloys from 0% zinc to about 40% zinc with the remainder copper.

EXAMPLE III

Copper-nickel alloys from about 0% nickel to about 40 to 50% nickel, with the balance copper.

EXAMPLE IV

Copper-zinc-nickel alloys from about 0% to about 20% nickel, about 0% to about 25% zinc, with the balance copper.

EXAMPLE V

Copper-silicon alloys from 0% to about 3% silicon with the remainder copper.

EXAMPLE VI

| | Percent |
|---|---|
| Manganese | 0. to 0.50 |
| Tin | 0. to 1.50 |
| Iron | 0. to 1.50 |
| Nickel | 0. to 10.00 |
| Silicon | 0. to .15 |
| Zinc | 38. to 42.00 |
| Copper | Balance |

EXAMPLE VII

| | Percent |
|---|---|
| Silver | 5 to 80 |
| Zinc | 0 to 38 |
| Cadmium | 0 to 18 |
| Nickel | 0 to 5 |
| Copper | Balance |

EXAMPLE VIII

| | Percent |
|---|---|
| Cobalt | .20–.40 |
| Silver | .20 |
| Beryllium | 1.00–2.65 |
| Copper | Balance |

In addition to the above binders or matrix formulas the following specific binders or matrix compositions are satisfactory:

EXAMPLE IX

35% copper, 34% zinc, 25% nickel, 1% boron, 3% manganese, .5% silicon, 1% iron and 0.5% phosphorus is satisfactory. If desired, cobalt may be substituted for nickel.

EXAMPLE X

A further satisfactory binder material or matrix is composed of 35% copper, 25% zinc, 34% nickel, 1% boron, 2% manganese, 1% beryllium, .5% silicon, 1% iron and .5% phosphorus.

EXAMPLE XI

Still a further binder material or matrix formula is composed of 40% copper, 20% nickel, 35% zinc, 3.5% manganese, 1% boron, .5% silicon and 1% iron.

The above binders or matrixes are generally representative but any preferred binder or matrix formula may be used which has the qualities of wetting the cemented carbide bodies or grains, melting at a temperature or becoming molten at a temperature below that at which injurious heating of the cemented carbide bodies takes place and, preferably, the binder should have good alloying qualities. In addition, it should be tough, resilient, ductile and wear resistant and should be suitable for providing a shock barrier or shock cushion for the relatively brittle cemented carbide bodies.

As mentioned previously any cemented carbide bodies, and for oil field purposes such particles about 85 Rockwell A and above are satisfactory. For example, the following cemented carbides are satisfactory, granules consisting primarily of tungsten carbide with about 3 to 25% cobalt, nickel and/or iron; granules consisting of from about 0 to 35% titanium carbide, 3 to 25% cobalt, nickel and/or iron with the balance of tungsten carbide; granules consisting of about 0 to about 35% titanium carbide and/or CbC, 0 to about 25% cobalt, nickel and/or iron with the remainder of tungsten carbide; combinations of tungsten carbide, titanium carbide, tantalum carbide and chromium carbide with about 3 to about 25% cobalt, nickel and/or iron; and compositions consisting of chromium carbide and about 3 to about 25% cobalt, nickel and/or iron. More particularly, the following specific compositions are satisfactory:

EXAMPLE XII

|  | Percent |
| --- | --- |
| Tungsten carbide | 97 |
| Cobalt | 3 |

EXAMPLE XIII

|  | Percent |
| --- | --- |
| Tungsten carbide | 95.5 |
| Cobalt | 4.5 |

EXAMPLE XIV

|  | Percent |
| --- | --- |
| Tungsten carbide | 94 |
| Cobalt | 6 |

EXAMPLE XV

|  | Percent |
| --- | --- |
| Tungsten carbide | 91 |
| Cobalt | 9 |

EXAMPLE XVI

|  | Percent |
| --- | --- |
| Tungsten carbide | 87 |
| Cobalt | 13 |

EXAMPLE XVII

|  | Percent |
| --- | --- |
| Tungsten carbide | 80 |
| Cobalt | 20 |

In addition to the above specific examples of cemented carbides any of the commercial cemented carbide compositions having a hardness of about 85 Rockwell A and above for oil field purposes are satisfactory. Some of these commercially available cemented carbide compositions are those which are predominately tungsten carbide with tantalum carbide and about 13% cobalt; predominately tungsten carbide with tantalum carbide and about 6% cobalt; predominately tungsten carbide with titanium carbide and 6% cobalt; predominately tungsten carbide, with less titanium carbide than previously mentioned with 8% cobalt, and predominately tungsten carbide with a larger amount of titanium carbide and about 7% cobalt; predominately tungsten carbide with tantalum carbide and titanium carbide and 8% cobalt; predominately tungsten carbide with tantalum carbide and titanium carbide from about 8% cobalt to about 15% cobalt. In addition to the above-mentioned carbide compositions, any of the cemented carbides containing chromium carbide, vanadium carbide, molybdenum carbide, zirconium carbide, uranium carbide, tantalum carbide, columbium carbide and titanium carbide which have desired cutting or wearing properties may be used. Other cemented carbides, of course, may be used and the above list is merely exemplary.

The following specific examples are given which illustrate combinations of various cemented carbides and matrixes for various specific uses. These are, of course, illustrative.

EXAMPLE XVIII

A matrix composed of 35% copper, 35% zinc, 25% nickel, 1% boron, 0.5% phosphorus, 0.5% iron and 3% manganese and cemented carbide bodies composed of predominately WC, about 8% CO and 15 to 20% titanium carbide were heated in a furnace at a temperature in the preferred range of about 1875° F. to about 1950° F. for a period of about six to nine minutes in the presence of a brazing flux and glass slag. Temperatures as low as about 1825° F. and as high as about 2250° F. for periods of time from about three to five minutes to about fifteen minutes are satisfactory. In applying this hard facing material, the steel surface is wetted with the matrix metal with an oxyacetylene torch at about 1875° F. to about 1950° F., the hard facing material added and additional matrix and brazing flux added while continuing to heat with the torch until complete coverage and a homogeneous mass of matrix and carbides is obtained. The resulting hard faced surface is very good for steel cutting.

EXAMPLE XIX

A matrix of 35% copper, 25% zinc, 35% nickel, 1% boron, 2% manganese, 0.5% silicon, 1% iron and 0.5% phosphorus and bodies consisting predominately of WC with about 15% to 20% of titanium carbide and 11% cobalt were heated with an oxyacetylene torch in the preferred range of about 2050° F. to about 2150° F. until the matrix and brazing flux were melted. The cemented carbides were thoroughly puddled so that they were completely covered with the matrix. Temperatures as low as about 2000° F. and as high as about 2350° F. are satisfactory, however, and the resulting hard facing material was in the form of pads. The steel surface was wetted with the matrix, the hard surfacing material and additional matrix and flux were applied while heating with an oxyacetylene torch in the same temperature range until a covered, homogeneous mass of matrix and carbides was obtained. This also is very good for steel cutting purposes.

EXAMPLE XX

A rod composed of 1% to 2% copper, 15.5% to 19% chromium, 1% to 2½% nickel, 6% to 9½% phosphorus and the balance iron and cemented carbides composed of 94% WC and 6% CO were heated with an oxyacetylene torch, carb. flame for a sufficient length of time to melt the rod and added brazing flux and to thoroughly puddle the cemented carbides so that they were completely covered with the melted rod. Temperatures as low as about 1950° F. and as high as 2000° F. are satisfactory, however. A steel surface was wetted with the matrix of Example XVIII, the treated carbides and additional matrix of Example XVIII and flux were added, all at temperatures of about 1975° F. and until complete coverage and a homogeneous mass of matrix and carbides was obtained. The resulting product is very good for use in hard formations in drilling wells.

EXAMPLE XXI

A matrix of 42% to 46% copper, 51% to 55% zinc and 1% to 4% nickel and cemented carbides composed of 91% WC and 9% CO were heated by an oxyacetylene torch at 1625° F. until the matrix and added brazing flux were melted and the carbides thoroughly puddled and covered with matrix. Satisfactory results, however, weer obtained by heating from about 1600° F. to about 1750° F. The steel surface was wetted with the matrix of Example XIX, the treated carbides and additional matrix of Example XIX and flux added, all while heating with an oxyacetylene torch at about 1625° F. until the steel surface and carbides were completely covered and a homogeneous mass of matrix and carbides obtained.

The above specific combinations are illustrative for the purpose of disclosure and many other specific combinations will suggest themselves to those skilled in the art which are encompassed within the present invention.

The hard facing material may be applied to the particular tools or surfaces, whether these are integral or inserts, in any preferred manner. The following are presently preferred methods of application.

The methods of application are best illustrated in conjunction with the accompanying drawings, where like character references designate like parts throughout the several views, and where Figure 1 is a sectional elevation of a mold and core bit for forming cutting elements on the core bit, Figure 2 is a side elevation, partly in section, illustrating a core bit made in the mold of Figure 1, Figure 3 is a bottom view taken along line 3—3 of Figure 2, Figure 4 is a plan view of a modified mold for making hard faced inserts according to the invention, Figure 5 is a cross-sectional view taken along line 5—5 of Figure 4, Figure 6 is a cross-sectional view taken along line 6—6 of Figure 4, Figure 7 is a perspective view of a hard faced insert formed in the mold of Figures 4, 5 and 6, and Figure 8 illustrates a pad of hard facing material according to the invention.

Referring now to Figures 4, 5 and 6, one preferred method of application is to take the preformed or crushed bodies of cemented carbide 10 of varying or constant mesh size, preferably %4th inch to ¼th inch and place them together with the particular material, that is the iron, steel or ferrous material that is to be hard faced, in a mold 12 of the desired shape and size, such as a ceramic mold. As illustrated in the drawings a cutter insert 14 is being hard faced. As further illustrated the mold may be used to hard face a plurality of inserts, and for this purpose the ceramic spacers 15 may be positioned between each insert. A brazing flux 16 and high temperature slag 18 are then added. The mold together with its contents is placed into a suitable oven or furnace and heated to a desired temperature, preferably within the range of about 1600° F. to about 3000° F. until the binder or matrix alloy has become molten and flows down and inbetween the carbide bodies and the carbide bodies and metal surface of the insert 14. The mold may be agitated during this time if desired so that the cemented carbide bodies are suspended in the matrix. The matrix or binder material is maintained in a molten condition for a sufficient period of time to permit intergranular penetration, that is to penetrate into and along the grain structure of the cemented carbide bodies and to permit alloying of the binder material with the cementing material of the bodies. Ordinarily a period of time from about three to about twenty minutes is sufficient. It is important that there is not too much penetration as this changes the character of the cemented carbide bodies and, in general, gives an inferior product. If the higher temperatures are used, very short periods of time should be used. As previously mentioned the heating should be such that no injury is done to the cemented carbides and for most cases 2400° F. to 2650° F. is the highest temperature required in practice. The mold is then withdrawn from the heat chamber and allowed to cool at atmosphere which permits the cemented carbide bodies and binder or matrix to contract slowly and prevents cracking of the hard metal bodies. The cemented carbide particles and binder or matrix metal components are removed from the mold, where they are then cleaned and sand blasted or tumbled to remove any mold particles therefrom. This results in the hard faced insert 14 illustrated in Figure 7, which may then be attached or located as desired, for example on a bit head, core head, reamer body, stabilizer, cones, wheels, arms, protrusions, shoulders or body walls and the like, the shape of the insert being accommodated to the particular use. Also, if desired, the hard surface may be ground.

Referring now to Figure 1, a further presently preferred method of hard surfacing or forming abrasive means on various tools is to place the particular tool into the mold 12a, such as a bit head, core head or other tool in which the bowl has previously been prepared to conform to the size and shape of the particular cutting head with grooves provided to conform to the outside diameter or inside diameter of cutting components. Here, a core head 14a is illustrated. The proper size and shape ceramic separators 15a are placed at the desired positions in the mold to insure the proper size and shape of the cutting components of the cemented carbide particles and the desired cemented carbide bodies 10a are placed in the wells between the separators in quantities sufficient to give the cutting components the size, height and depth desired. A mixture of flux and matrix 16a and slag 18a are added, as illustrated. The mold and particular tool are then placed in the furnace and processed as mentioned previously, the matrix, flux and slag melting and flowing downwardly around and inbetween the carbide bodies. After removal from the furnace and cooling at room temperature, the bit or tool may be cleaned, such as by sand blasting and the like to remove excess matrix and mold or separator particles. If desired, the hard surface portions may then be ground to any desired size. Such a finished core bit is illustrated in Figures 2 and 3.

Yet a further presently preferred method of forming the hard surfacing material is to form it in pads of the desired thickness and size and to then apply it to the particular surface to be hard faced. These pads 10b are illustrated in Figure 8 to which reference is now made. For example, the desired cemented carbide bodies may be placed in a ceramic mold along with the desired matrix material and heated as mentioned previously to form various sized pads of the cemented carbide bodies and the brazing type matrix or binder. These pads may then be applied directly to the surface to be hard faced with an acetylene torch or by an electric arc method. Preferably, the intensity of the heat utilized to apply the material to the surface should be such that an appreciable number of bodies of the cemented carbide grains are not melted or fused to the binder material, but brazing or fusion of the binder material with the surface is obtained. Also, if desired, the surface may previously be treated, for example, the surface may be tinned with a suitable alloy, such as a copper base, nickel, manganese or zinc alloy of high tensile strength, preferably from about 80,000 to 100,000 pounds per square inch for most oil field tools. This material may be applied to the surface with a neutral flame using a borax base flux at temperatures of from about 1500° F. to about 1900° F. The hard metal pad may then be applied to the tinned surface by applying flux and heating with a torch, although electric arc may be used, until the matrix or binder material is homogeneously brazed or welded to the tinned surface. If desired, additional matrix or binder material may be applied to the surfaces holding or binding the hard metal bodies until all the hard metal bodies are covered and held together in a flat or somewhat evenly-surfaced plane or planes, although such is not necessary depending upon the particular design and use. While reference has been made to pads, it is understood that any desired shape of the pads may be formed; for example, rods and various other shapes.

In some cases it is desirable that the hard metal bodies are of irregular shapes and varying sizes and that they are dispersed throughout the binder material in a random and unsymmetrical pattern. In other cases, predetermined geometric shapes of cemented carbides may regularly be dispersed throughout the binder material. Both arrangements, as well as others are quite advantageous. For example, in drilling tools, the earth formation or rock will wear away the softer binder material, such being much softer than the hard metal bodies, thereby exposing the sharp points of the hard metal bodies which act as small finger-like cutters or serrations, for example several serrations or tooth-type cutters or bits. This finger type cutting action is advantageous in that the amount and arrangement of the cutting points on each cutting element or tooth of a drill or bit is different from the others and, as the cutting bodies wear away, as well as the steel and matrix, the pattern of the cutting bodies changes as new cutting elements are brought into contact with the formation. In irregular shapes, this action is ever present because no two or more of the cutting elements have cutting bodies of the same shapes and arrangement which thereby causes a continual sharpening or self sharpening action of the cutting elements. In the event a pad or lobe of bonded cemented carbide bodies is applied to the surface, as the cemented carbide bodies exposed become worn or blunted the pressure on the metal or formation being sheared will eventually be built up to a point where the matrix material will no longer hold the exposed cemented carbide bodies thereby permitting these bodies to be pulled away from the matrix and further movement and friction will wear the matrix away permitting the next highest point of cemented carbide body having a sharp cutting edge to embed into the particular objective metal or formation.

Various tools, cutting elements and the like which have been hard surfaced according to the invention have increased the length of life of the particular tool and the cutting action many times. While the reasons for the highly advantageous results are not fully understood, it is presently believed that these result from one or more of the following. Intergranular penetration occurs along the entire outside surface of each individual body of cemented carbide and there is alloying with the cementing materials thereof. The absence of formation of $W_2C$ and the absence of the brittle metal interfaces between the binder and the cemented carbide grains thereby preserving the desirable properties of the cemented carbide bodies and not forming undesirable properties is believed to be an important factor in this regard. Also, the ability of the matrix or binder material to absorb or relieve stresses produced by the difference in the coefficients of expansion between the binder or matrix material and the hard metal bodies as well as to provide a tough or ductile cushion for the hard brittle cemented carbide bodies is believed to be an important factor.

In any event, a greatly improved hard surfacing material which is readily applicable to all metal surfaces desired to be hard surfaced, whether for wearing qualities or cutting qualities or both, is provided and which is extremely tough, rugged and durable in use under the most severe conditions and in which the desirable properties of the cemented carbides are retained without forming undesirable properties in the hard facing operation.

While the several examples of the invention, for the purpose of disclosure, have been with specific reference to various tools used in the drilling, production and maintenance of oil, gas and like wells, numerous other applications will readily suggest themselves to those skilled in the art which are encompassed within the scope of the present invention.

The present invention is well adapted to attain the ends and objects mentioned as well as others inherent therein. Numerous changes may be made in materials and processes of manufacture within the scope of the invention as encompassed by the scope of the appended claims.

What is claimed is:

1. A hard surfacing material comprising a plurality of contiguous bodies of cemented metal carbide bonded together by and dispersed throughout a metal matrix, said cemented carbide bodies each comprising particles of metal carbide cemented together by a ductile cementing metal having a lower melting point than said carbide and comprising at least one metal selected from the group consisting of cobalt, iron and nickel, said matrix filling the spaces between said bodies, being alloyed to said cementing metal at the surfaces of said bodies and inwardly thereof for a limited distance, and comprising a tough, ductile and shockproof metal having a melting point not substantially higher than the melting point of said cementing metal.

2. The material of claim 1 wherein said bodies are of a hardness of at least about 85 Rockwell A.

3. The material of claim 1 wherein the size of said bodies is in the range of 3/64 to 1/4 inch.

4. The material of claim 1 wherein each body is completely surrounded by the metal of said matrix.

5. A cutting tool comprising a solid metal supporting base member having a cutting face formed of a hard surfacing material, said material comprising a plurality of contiguous bodies of cemented metal carbide bonded together by and dispersed throughout a metal matrix, said cemented carbide bodies each comprising particles of metal carbide cemented together by a ductile cementing metal having a lower melting point than said carbide and comprising at least one metal selected from the group consisting of cobalt, iron and nickel, said matrix filling the spaces between said bodies, being alloyed to said cementing metal at the surfaces of said bodies and inwardly thereof for a limited distance, and comprising a tough, ductile and shockproof metal having a melting point not substantially higher than the melting point of said cementing metal, each of said bodies having sharp edge portions at said cutting face.

6. A tool as defined in claim 5 wherein the size of said bodies is in the range of about 3/64–1/4 inch.

7. A method of making a hard facing material, comprising the steps of; melting a ductile metal matrix having a melting point of about 1600° F. to 2450° F., wetting bodies of cemented metal carbide particles, bonded together by a ductile cementing metal comprising at least one metal selected from the group consisting of cobalt, iron and nickel, with said melted matrix metal, said matrix metal being tough, ductile and shockproof and capable of alloying with said cementing metal and having a melting point not substantially higher than said cementing metal, forming a mass of said melted matrix and a plurality of said wetted bodies in contiguous relation dispersed throughout the same, maintaining said mass at at least the melting temperature of said matrix metal for a period of time not exceeding about 20 minutes to cause said matrix metal to alloy with said cementing metal for a subsantial but limited distance inwardly of the surfaces of said bodies, then letting said mass solidify; the melting point of both said cementing metal and said matrix metal being below a temperature capable of producing injurious effects in said carbide bodies.

8. The method of claim 7 including the further steps of; melting the matrix metal of said solid mass in contact with a surface of a metallic supporting member, maintaining said matrix metal in molten condition, at a temperature not substantially above the melting point of said cementing metal to alloy with the metal of said member at said surface, thereby to provide a hard facing on said surface.

9. The method of claim 7 including the further steps of; applying a film of molten metal to a surface of a metal supporting member wettable thereby, placing said solid mass in contact with said film, maintaining said film in molten condition to alloy with the metal of said matrix, whereby to provide a hard facing on said surface.

(References on following page)

References Cited in the file of this patent

UNITED STATES PATENTS

| Number | Name | Date |
|---|---|---|
| 1,959,879 | Schwarzkopf | May 22, 1934 |
| 1,960,055 | Kelley | May 22, 1934 |
| 2,506,556 | Ball et al. | May 2, 1950 |
| 2,552,485 | Howard et al. | May 8, 1951 |
| 2,562,587 | Swearingen | July 31, 1951 |
| 2,630,383 | Schwartz et al. | Mar. 3, 1953 |
| 2,712,988 | Kurtz | July 12, 1955 |